United States Patent
Li et al.

(10) Patent No.: US 9,536,483 B2
(45) Date of Patent: Jan. 3, 2017

(54) DISPLAY HAVING SHARED DRAIN STRUCTURE

(71) Applicant: AU Optronics Corp., Hsin-Chu (TW)

(72) Inventors: Kuo-Ming Li, Hsin-Chu (TW);
Cheng-Chiu Pai, Hsin-Chu (TW);
Chun-Hung Kuo, Hsin-Chu (TW);
Yu-Hsuan Li, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 411 days.

(21) Appl. No.: 14/017,328

(22) Filed: Sep. 4, 2013

(65) Prior Publication Data
US 2014/0160096 A1     Jun. 12, 2014

(30) Foreign Application Priority Data
Dec. 12, 2012 (TW) .............................. 101146973 A

(51) Int. Cl.
*G09G 3/36* (2006.01)
*G02F 1/1345* (2006.01)

(52) U.S. Cl.
CPC ......... *G09G 3/3614* (2013.01); *G02F 1/13454* (2013.01); *G02F 1/1345* (2013.01); *G09G 2300/0426* (2013.01)

(58) Field of Classification Search
CPC ..... G06F 3/038; G09G 3/3614; G09G 3/3607; G09G 2310/0297
See application file for complete search history.

(56) References Cited

U.S. PATENT DOCUMENTS

| | | | |
|---|---|---|---|
| 2009/0267932 A1 | 10/2009 | Lin et al. | |
| 2010/0117939 A1* | 5/2010 | Lee ...................... | G09G 3/3275 345/76 |
| 2013/0241960 A1* | 9/2013 | Xu ........................ | G09G 3/3413 345/690 |

* cited by examiner

*Primary Examiner* — Jose Soto Lopez
(74) *Attorney, Agent, or Firm* — WPAT, PC; Justin King

(57) ABSTRACT

A display includes a source driver, a demultiplexer, a first data line, a second data line, a first pixel and a second pixel. The demultiplexer includes a first pixel signal transmission unit and a second pixel signal transmission unit. The first pixel signal transmission unit includes a first sub-pixel signal transmission unit, a second sub-pixel signal transmission unit and a third sub-pixel signal transmission unit. The first sub-pixel signal transmission unit and the second sub-pixel signal transmission unit share a drain. A second pixel signal transmission unit next to the first pixel signal transmission unit includes a fourth sub-pixel signal transmission unit, a fifth sub-pixel signal transmission unit and a sixth sub-pixel signal transmission unit. The fourth sub-pixel signal transmission unit and the fifth sub-pixel signal transmission unit share another drain.

7 Claims, 7 Drawing Sheets

DISPLAY HAVING SHARED DRAIN STRUCTURE

BACKGROUND OF THE INVENTION

1. Field of the Invention

The present invention relates to a display, especially adjacent sub-pixels in a display having a shared drain.

2. Description of the Prior Art

Portable electronic devices such as smart phones, notebook computers and tablets, are gradually designed to integrate multiple functions to improve audio/video functions. However, the improvements of the audio/video functions may cause high power consumption. Since the power of the portable electronic device is provided by built-in battery only, the power of the portable electronic device will soon dry out due to high power consumption, causing inconvenience to users.

Thus, how to reduce the power consumption becomes an important issue. At present, displays can be driven by analog current (AC) in a frame inversion, row inversion, column inversion or dot inversion mode. In general, displays driven in the column inversion mode have better image quality. Please refer to FIGS. 1A to 1C, which show a prior art display 100 transmitting data at various periods. The display 100 comprises a source driver 120, a plurality of switches, a plurality of data lines and a plurality of pixels. The source driver 120 outputs data signals to the pixels through a plurality of three-output demultiplexers, so as to transmit data to the sub-pixels of each pixel in sequence. In the column inversion mode, sub-pixels of two adjacent columns have opposite polarities. Based on the above, the operation of the display 100 is as follows:

In the first period, as shown in FIG. 1A, the switches T1 of the pixels P1, P2 and P3 are all turned on, so that the source driver 120 can output data to the sub-pixel r1 of the pixel P1, the sub-pixel r2 of the pixel P2 and the sub-pixel r3 of the pixel P3 through the data lines s1, s2 and s3, respectively. In the period, the data output to the sub-pixel r1 of the pixel P1 and the sub-pixel r3 of the pixel P3 has a positive polarity. The data output to the sub-pixel r2 of the pixel P2 has a negative polarity.

In the second period after the first period, as shown in FIG. 1B, the switches T1 are turned off and the switches T2 are turned on. While the sub-pixels r1, r2 and r3 stores the data received in the first period, the source driver 120 outputs data to the sub-pixels g1, g2 and g3. In order to provide sub-pixels in the adjacent columns with opposite polarities, the polarities of the data outputted by the source driver 120 in the second period are inversed to the data outputted by the source driver 120 in the first period.

In the third period after the second period, as shown in FIG. 1C, the switches T2 are turned off and the switches T3 are turned on. While the sub-pixels r1, r2 and r3 stores the data received in the first period and the sub-pixels g1, g2 and g3 stores the data received in the second period, the source driver 120 outputs data to the sub-pixels b1, b2 and b3. In order to provide sub-pixels in the adjacent columns with opposite polarities, the polarities of the data outputted by the source driver 120 in the third period are inversed to the data outputted by the source driver 120 in the second period.

In view of above, in order to implement column inversion, the source driver 120 must continuously change the output polarities, consuming a lot of power. Further each column of pixels is provided with a corresponding demultiplexer, the display 100 has to allocate a big space to accommodate the great number of demultiplexers and their associated circuitry.

SUMMARY OF THE INVENTION

An embodiment of the present invention relates to a display comprising a source driver, a demultiplexer, a first data line, a second data line, a first pixel and a second pixel. The source driver is used for providing data. The demultiplexer comprises a first pixel signal transmission unit, a second pixel signal transmission unit, a first gate signal transmission end, a second gate signal transmission end and a third gate signal transmission end. The first pixel signal transmission unit comprises a first sub-pixel signal transmission unit, a second sub-pixel signal transmission unit and a third sub-pixel signal transmission unit. The first sub-pixel signal transmission unit and the second sub-pixel signal transmission unit have a first drain. The second pixel signal transmission unit is adjacent to the first pixel signal transmission unit. The second pixel signal transmission unit comprises a fourth sub-pixel signal transmission unit, a fifth sub-pixel signal transmission unit and a sixth sub-pixel signal transmission unit. The fourth sub-pixel signal transmission unit and the fifth sub-pixel signal transmission unit have a second drain. The first gate signal transmission end is coupled to a gate of the first sub-pixel signal transmission unit and a gate of the fourth sub-pixel signal transmission unit. The second gate signal transmission end is coupled to a gate of the second sub-pixel signal transmission unit and a gate of the fifth sub-pixel signal transmission unit. The third gate signal transmission end is coupled to a gate of the third sub-pixel signal transmission unit and a gate of the sixth sub-pixel signal transmission unit. The first data line has a first end coupled to the source driver, and a second end coupled to the first drain and a drain of the sixth sub-pixel signal transmission unit, for providing data to the first drain and the drain of the sixth sub-pixel signal transmission unit. The second data line has a first end coupled to the source driver, and a second end coupled to the second drain and a drain of the third sub-pixel signal transmission unit, for providing data to the second drain and the drain of the third sub-pixel signal transmission unit. The first pixel comprises a first sub-pixel, a second sub-pixel and a third sub-pixel. The first sub-pixel is coupled to a source of the first sub-pixel signal transmission unit. The second sub-pixel is coupled to a source of the second sub-pixel signal transmission unit. The third sub-pixel is coupled to a source of the third sub-pixel signal transmission unit. The second pixel comprises a fourth sub-pixel, a fifth sub-pixel and a sixth sub-pixel. The fourth sub-pixel is coupled to a source of the fourth sub-pixel signal transmission unit. The fifth sub-pixel is coupled to a source of the fifth sub-pixel signal transmission unit. The sixth sub-pixel is coupled to a source of the sixth sub-pixel signal transmission unit.

Another embodiment of the present invention relates to a display comprising a source driver, a demultiplexer, a first data line, a second data line, a first pixel and a second pixel. The source driver is used for providing data. The demultiplexer comprises a first pixel signal transmission unit, a second pixel signal transmission unit, a first gate signal transmission end, a second gate signal transmission end and a third gate signal transmission end. The first pixel signal transmission unit comprises a first sub-pixel signal transmission unit, a second sub-pixel signal transmission unit and a third sub-pixel signal transmission unit. The second pixel signal transmission unit is adjacent to the first pixel signal transmission unit. The second pixel signal transmission unit comprises a fourth sub-pixel signal transmission unit, a fifth sub-pixel signal transmission unit and a sixth sub-pixel signal transmission unit. The first sub-pixel signal transmission unit and the second sub-pixel signal transmission unit have a first drain. The fourth sub-pixel signal transmission unit and the fifth sub-pixel signal transmission unit have a second drain. The first gate signal transmission end is coupled to a gate of the first sub-pixel signal transmission unit and a gate of the fourth sub-pixel signal transmission unit. The second gate signal transmission end is coupled to a gate of the second sub-pixel signal transmission unit and a gate of the fifth sub-pixel signal transmission unit. The third gate signal transmission end is coupled to a gate of the third sub-pixel signal transmission unit and a gate of the sixth sub-pixel signal transmission unit. The first data line has a first end coupled to the source driver, and a second end coupled to the first drain and a drain of the third sub-pixel signal transmission unit, for providing data to the first drain and the drain of the third sub-pixel signal transmission unit. The second data line has a first end coupled to the source driver, and a second end coupled to the second drain and a drain of the sixth sub-pixel signal transmission unit, for providing data to the second drain and the drain of the sixth sub-pixel signal transmission unit. The first pixel comprises a first sub-pixel, a second sub-pixel and a third sub-pixel. The first sub-pixel is coupled to a source of the first sub-pixel signal transmission unit. The second sub-pixel is coupled to a source of the fifth sub-pixel signal transmission unit. The third sub-pixel is coupled to a source of the third sub-pixel signal transmission unit. The second pixel comprises a fourth sub-pixel, a fifth sub-pixel and a sixth sub-pixel. The fourth sub-pixel is coupled to a source of the fourth sub-pixel signal transmission unit. The fifth sub-pixel is coupled to a source of the second sub-pixel signal transmission unit. The sixth sub-pixel is coupled to a source of the sixth sub-pixel signal transmission unit.

These and other objectives of the present invention will no doubt become obvious to those of ordinary skill in the art after reading the following detailed description of the preferred embodiment that is illustrated in the various figures and drawings.

DETAILED DESCRIPTION

The detailed descriptions of the present invention are exemplified below in examples. However, the examples are merely used to illustrate the present invention, not to limit the present invention. Because one skilled in the art may modify the present invention or combine the present invention with some features within the scope of the present invention, the claimed scope of the present invention should be referred to in the following claims. In the present specification and claims, the term "comprising" is open type and should not be viewed as the term "consisted of." Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means.

The embodiments and figures are provided as follows in order to illustrate the present invention in detail, but the claimed scope of the present invention is not limited by the provided embodiments and figures. Further, the numbers of steps performed in the methods of the present invention are not used to limit the priority of performing steps of the present invention. Any methods formed by recombining the steps of the present invention belong to the scope of the present invention.

Figure 1A:
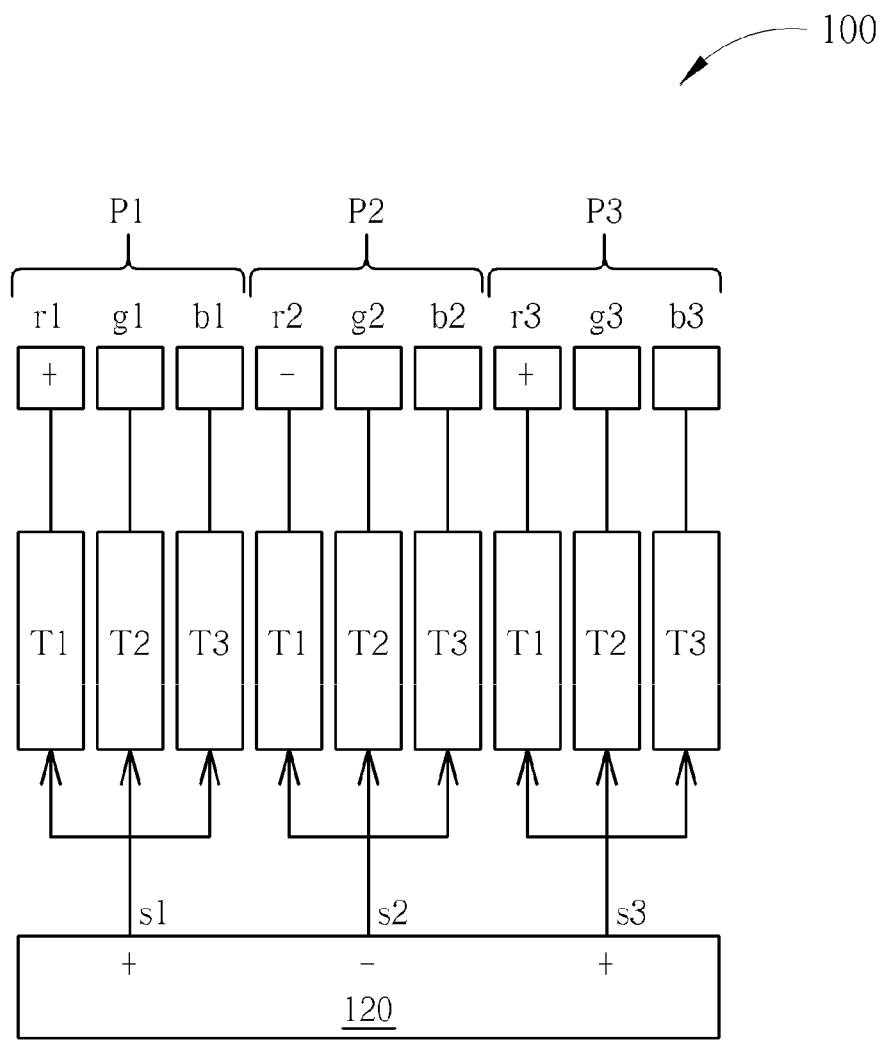
FIGS. 1A to 1C show a prior art display transmitting data at various periods.
Figure 1B:
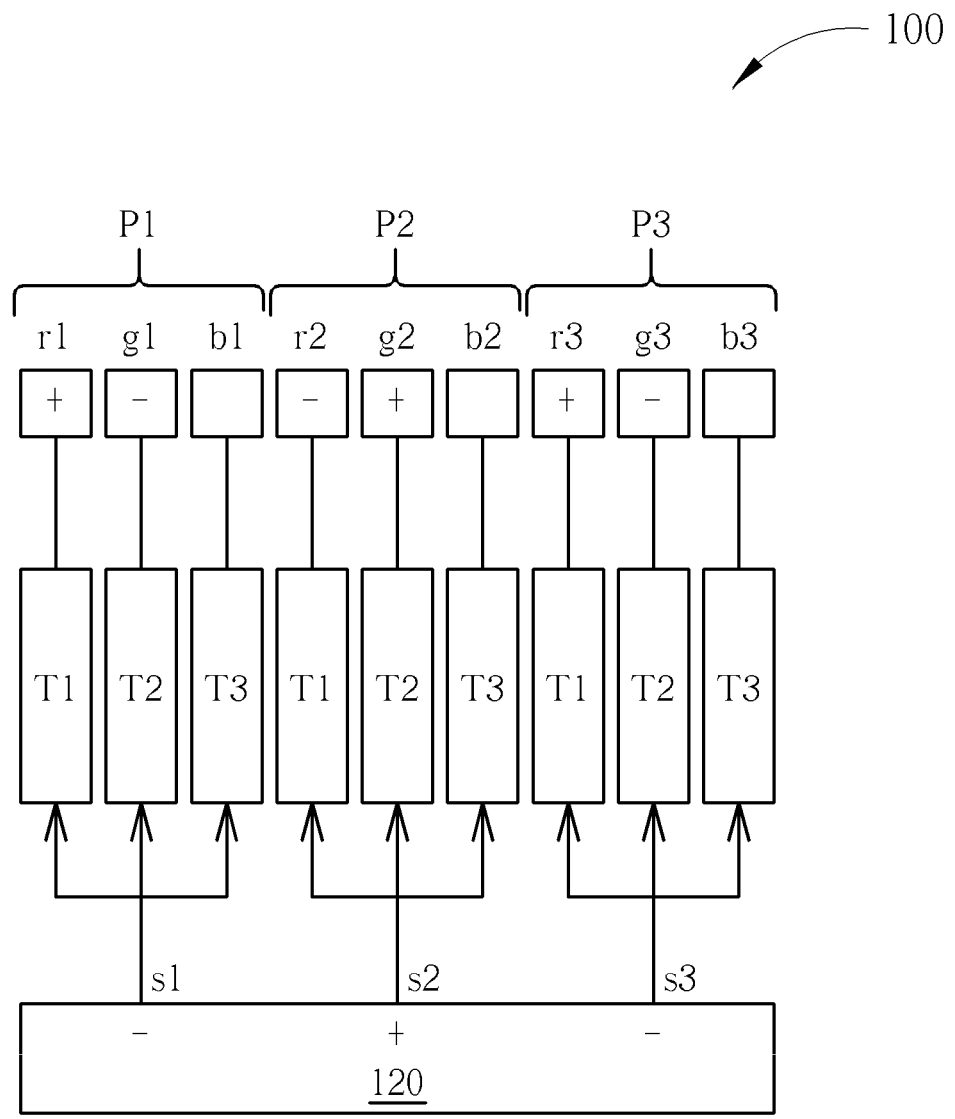
Figure 1C:
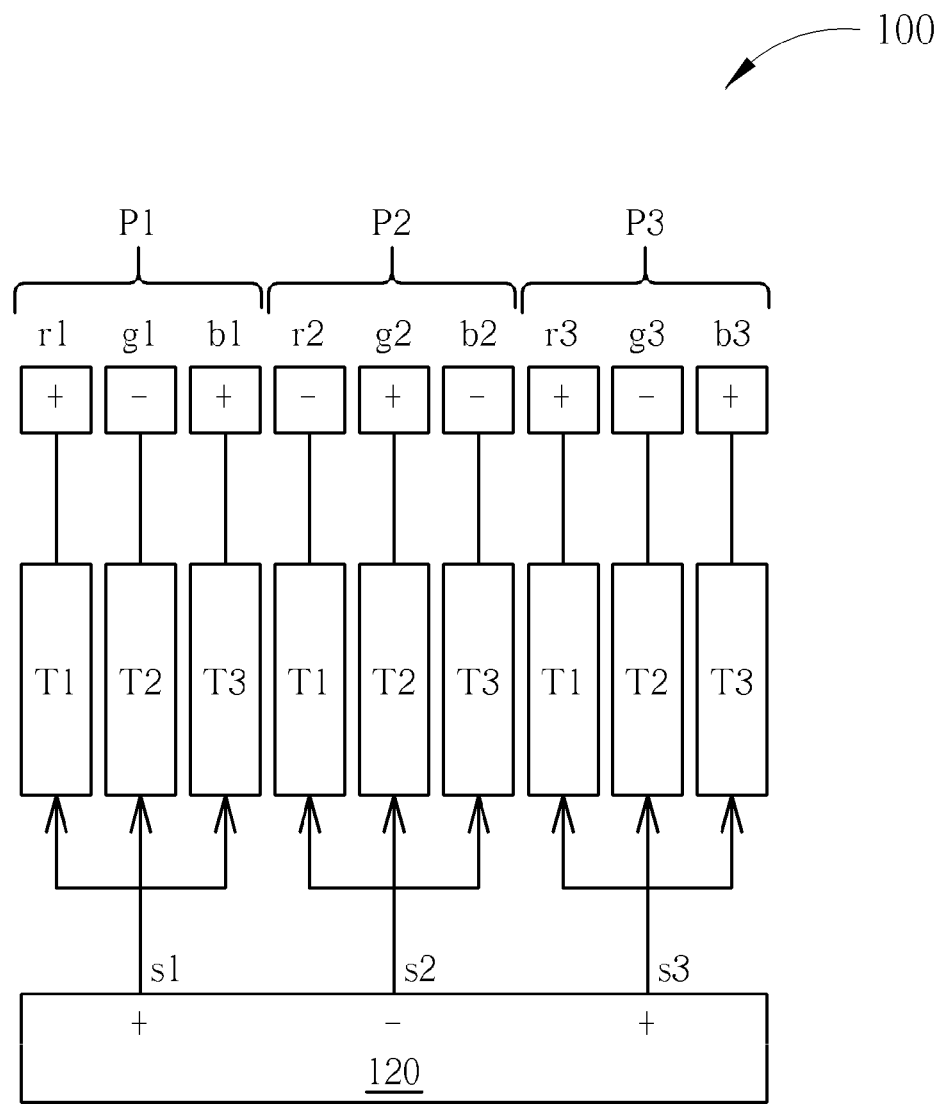
Figure 2A:
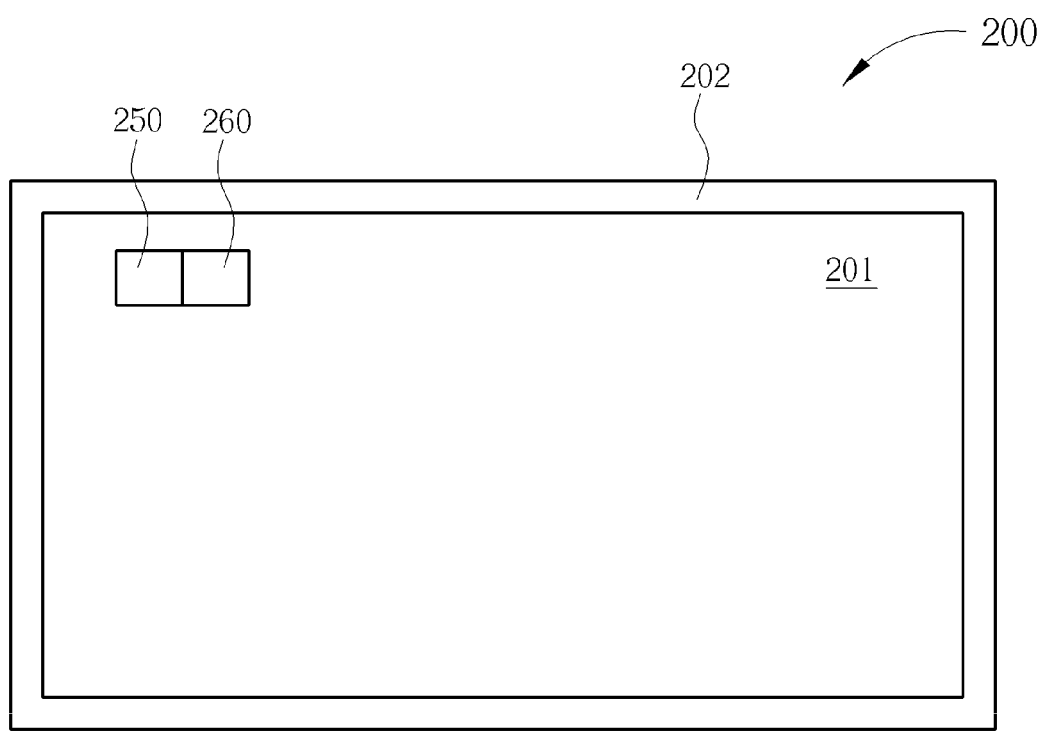
FIG. 2A shows a display according to a first embodiment of the present invention.
Figure 2B:
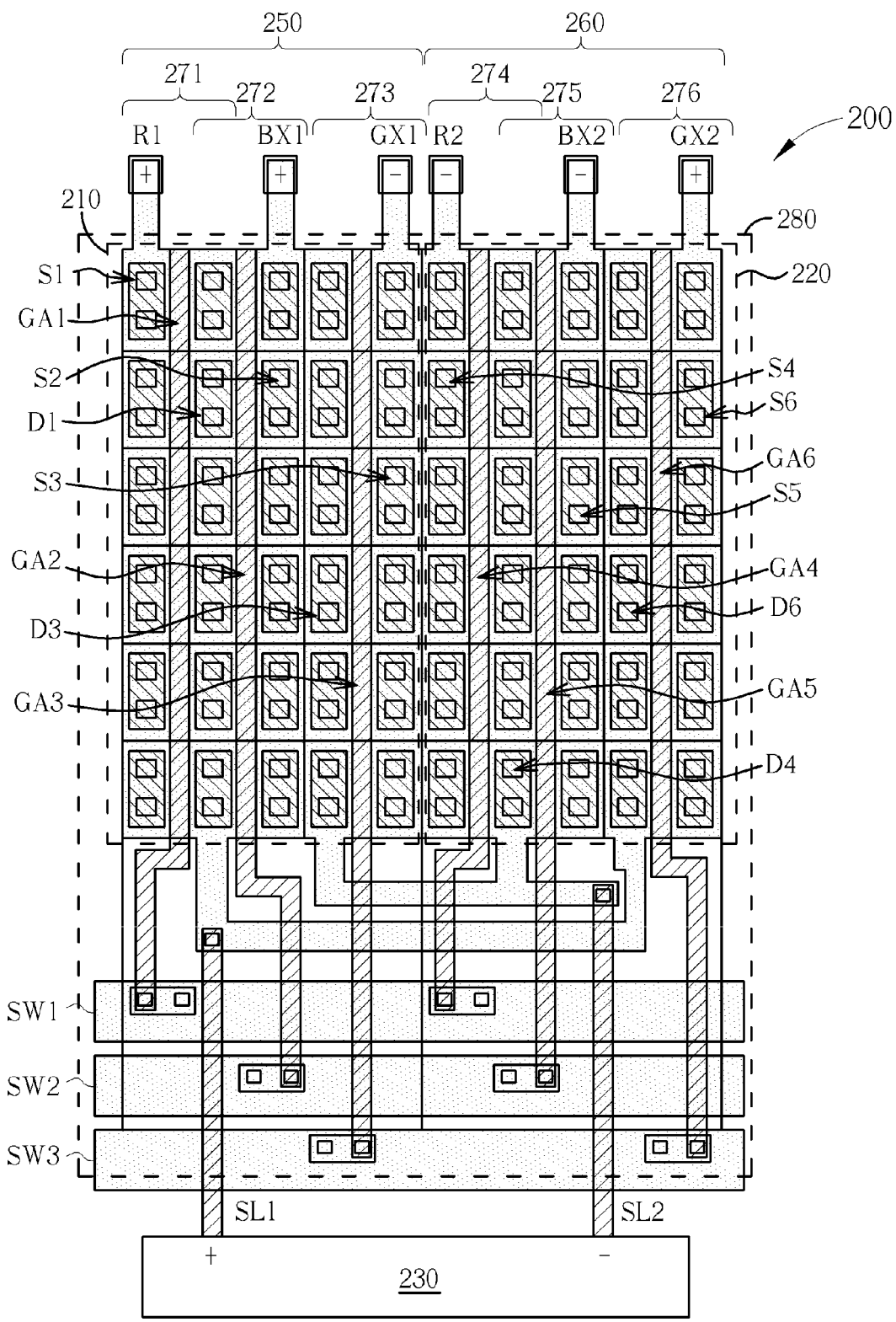
FIG. 2B shows inner configurations of the display in FIG. 2A.

Please refer to FIGS. 2A and 2B. FIG. 2A shows a display 200 according to a first embodiment of the present invention. FIG. 2B shows inner configurations of the display 200. The display 200 comprises a display area 201 and a GOA (Gate Driver On Array) area 202. Besides, the display 200 comprises a source driver 230, a demultiplexer 280, a first data line SL1, a second data line SL2, a first pixel 250 and a second pixel 260. The display area 201 is used to display images, and the first pixel 250 and the second pixel 260 are configured inside the display area 201. The GOA area 202 of the display 200 can be the area other than the display area 201, and the source driver 230 is configured inside the GOA area 202. The source driver 230 is used for providing data to the first data line SL1 and the second data line SL2. The demultiplexer 280 comprises a first pixel signal transmission unit 210, a second pixel signal transmission unit 220, a first gate signal transmission end SW1, a second gate signal transmission end SW2 and a third gate signal transmission end SW3.

The first pixel signal transmission unit 210 comprises a first sub-pixel signal transmission unit 271, a second sub-pixel signal transmission unit 272 and a third sub-pixel signal transmission unit 273. The first sub-pixel signal transmission unit 271 has a source S1 and a gate GA1. The second sub-pixel signal transmission unit 272 has a source S2 and a gate GA2. The first sub-pixel signal transmission unit 271 and the second sub-pixel signal transmission unit 272 have a first drain D1. In other words, the first sub-pixel signal transmission unit 271 and the second sub-pixel signal transmission unit 272 share the same first drain D1. The third sub-pixel signal transmission unit 273 has a drain D3, a source S3 and a gate GA3. The second pixel signal transmission unit 220 is adjacent to the first pixel signal transmission unit 210. The second pixel signal transmission unit 220 comprises a fourth sub-pixel signal transmission unit 274, a fifth sub-pixel signal transmission unit 275 and a sixth sub-pixel signal transmission unit 276. The fourth sub-pixel signal transmission unit 274 has a source S4 and a gate GA4. The fifth sub-pixel signal transmission unit 275 has a source S5 and a gate GA5. The fourth sub-pixel signal transmission unit 274 and the fifth sub-pixel signal transmission unit 275 have a second drain D4. In other words, the fourth sub-pixel signal transmission unit 274 and the fifth sub-pixel signal transmission unit 275 share the same second drain D4. With the topology, the layout area of the circuit is able to be reduced. The sixth sub-pixel signal transmission unit 276 has a drain D6, a source S6 and a gate GA6. As shown in FIG. 2B, the source S1 of the first sub-pixel signal transmission unit 271, the gate GA1 of the first sub-pixel signal transmission unit 271, the first drain D1, the gate GA2 of the second sub-pixel signal transmission unit 272, the source S2 of the second sub-pixel signal transmission unit 272, the drain D3 of the third sub-pixel signal transmission unit 273, the gate GA3 of the third sub-pixel signal transmission unit 273, the source S3 of the third sub-pixel signal transmission unit 273, the source S4 of the fourth sub-pixel signal transmission unit 274, the gate GA4 of the fourth sub-pixel signal transmission unit 274, the second drain D4, the gate GA5 of the fifth sub-pixel signal transmission unit 275, the source S5 of the fifth sub-pixel signal transmission unit 275, the drain D6 of the sixth sub-pixel signal transmission unit 276, the gate GA6 of the sixth sub-pixel signal transmission unit 276 and the source S6 of the sixth sub-pixel signal transmission unit 276 are arranged in sequence.

The first gate signal transmission end SW1 is coupled to the gate GA1 of the first sub-pixel signal transmission unit 271 and the gate GA4 of the fourth sub-pixel signal transmission unit 274. The second gate signal transmission end SW2 is coupled to the gate GA2 of the second sub-pixel signal transmission unit 272 and the gate GA5 of the fifth sub-pixel signal transmission unit 275. The third gate signal transmission end SW3 is coupled to the gate GA3 of the third sub-pixel signal transmission unit 273 and the gate GA6 of the sixth sub-pixel signal transmission unit 276. The first data line SL1 has a first end coupled to the source driver 230, and a second end coupled to the first drain D1 and the drain D6 of the sixth sub-pixel signal transmission unit 276, for providing data to the first drain D1 and the drain D6 of the sixth sub-pixel signal transmission unit 276. The second data line SL2 has a first end coupled to the source driver 230, and a second end coupled to the second drain D4 and the drain D3 of the third sub-pixel signal transmission unit 273, for providing data to the second drain D4 and the drain D3 of the third sub-pixel signal transmission unit 273.

The first pixel 250 comprises a first sub-pixel R1, a second sub-pixel BX1 and a third sub-pixel GX1. The second pixel 260 comprises a fourth sub-pixel R2, a fifth sub-pixel BX2 and a sixth sub-pixel GX2. The first sub-pixel R1, the second sub-pixel BX1, the third sub-pixel GX1, the fourth sub-pixel R2, the fifth sub-pixel BX2 and the sixth sub-pixel GX2 are arranged in sequence. The first sub-pixel R1 and the fourth sub-pixel R2 can be red sub-pixels. The second sub-pixel BX1 and the fifth sub-pixel BX2 can be blue sub-pixels. The third sub-pixel GX1 and the sixth sub-pixel GX2 can be green sub-pixels. The first sub-pixel R1 is coupled to the source S1 of the first sub-pixel signal transmission unit 271. The second sub-pixel BX1 is coupled to the source S2 of the second sub-pixel signal transmission unit 272. The third sub-pixel GX1 is coupled to the source S3 of the third sub-pixel signal transmission unit 273. The fourth sub-pixel R2 is coupled to the source S4 of the fourth sub-pixel signal transmission unit 274. The fifth sub-pixel BX2 is coupled to the source S5 of the fifth sub-pixel signal transmission unit 275. The sixth sub-pixel GX2 is coupled to the source S6 of the sixth sub-pixel signal transmission unit 276. The polarity of data provided by the first data line SL1 is inversed to the polarity of data provided by the second data line SL2 in the same frame. That is, the polarities of data provided by the first data line SL1 and the second data line SL2 are logically inversed.

In order to implement the column inversion, the source driver 120 of the prior art display 100 must continuously change the polarity, consuming a lot of power. However, the source driver 230 of the display 200 of the present embodiment remains outputting data with the same polarity, reducing power consumption.

Besides, take a 4.46-inch display with a 330 pixel per inch (PPI) resolution for example, if the first sub-pixel signal transmission unit 271 and the second sub-pixel signal transmission unit 272 both have their own drains, the overall width of the first pixel 250 and the second pixel 260 is about 94.5 µm. However, through having the first sub-pixel signal transmission unit 271 and the second sub-pixel signal transmission unit 272 sharing the first drain D1, and the fourth sub-pixel signal transmission unit 274 and the fifth sub-pixel signal transmission unit 275 sharing the second drain D4, the overall width of the first pixel 250 and the second pixel 260 is reduced to about 77.1 µm. Therefore, by sharing drains in the first embodiment, the width and the space allocated to the demultiplexer 280 are reduced.

Figure 3:
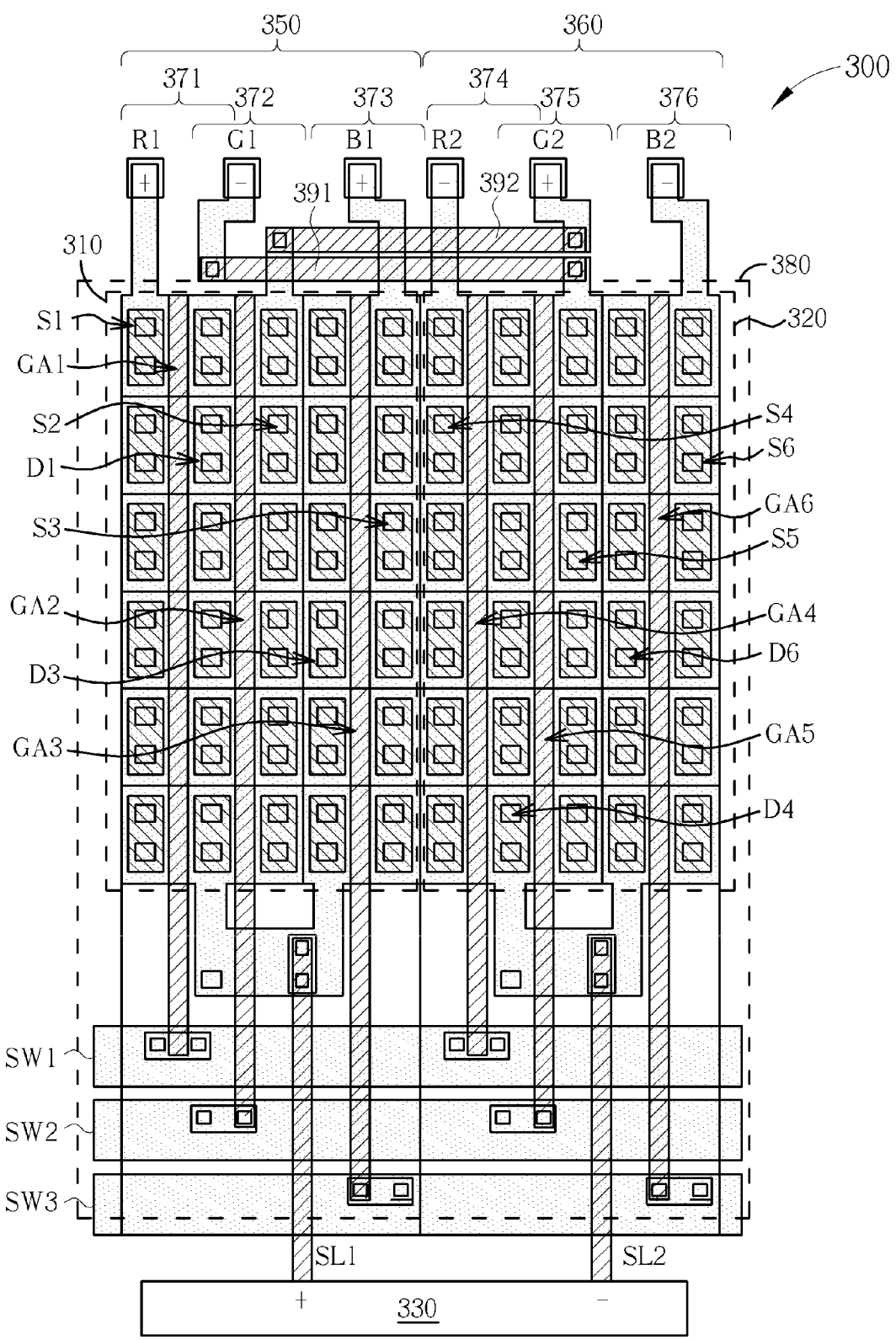
FIG. 3 shows a display according to a second embodiment of the present invention.

Please refer to FIG. 3, which shows a display 300 according to a second embodiment of the present invention. As shown in FIG. 3, the display 300 comprises a source driver 330, a demultiplexer 380, a first data line SL1, a second data line SL2, a first pixel 350 and a second pixel 360. The source driver 330 is used for providing data to the first data line SL1 and the second data line SL2. The demultiplexer 380 comprises a first pixel signal transmission unit 310, a second pixel signal transmission unit 320, a first gate signal transmission end SW1, a second gate signal transmission end SW2 and a third gate signal transmission end SW3.

The first pixel signal transmission unit 310 comprises a first sub-pixel signal transmission unit 371, a second sub-pixel signal transmission unit 372 and a third sub-pixel signal transmission unit 373. The first sub-pixel signal transmission unit 371 has a source S1 and a gate GA1. The second sub-pixel signal transmission unit 372 has a source S2 and a gate GA2. The first sub-pixel signal transmission unit 371 and the second sub-pixel signal transmission unit 372 have a first drain D1. The third sub-pixel signal transmission unit 373 has a drain D3, a source S3 and a gate GA3. The second pixel signal transmission unit 320 is adjacent to the first pixel signal transmission unit 310. The second pixel signal transmission unit 320 comprises a fourth sub-pixel signal transmission unit 374, a fifth sub-pixel signal transmission unit 375 and a sixth sub-pixel signal transmission unit 376. The fourth sub-pixel signal transmission unit 374 has a source S4 and a gate GA4. The fifth sub-pixel signal transmission unit 375 has a source S5 and a gate GA5. The fourth sub-pixel signal transmission unit 374 and the fifth sub-pixel signal transmission unit 375 have a second drain D4. The sixth sub-pixel signal transmission unit 376 has a drain D6, a source S6 and a gate GA6. As shown in FIG. 3, the source S1 of the first sub-pixel signal transmission unit 371, the gate GA1 of the first sub-pixel signal transmission unit 371, the first drain D1, the gate GA2 of the second sub-pixel signal transmission unit 372, the source S2 of the second sub-pixel signal transmission unit 372, the drain D3 of the third sub-pixel signal transmission unit 373, the gate GA3 of the third sub-pixel signal transmission unit 373, the source S3 of the third sub-pixel signal transmission unit 373, the source S4 of the fourth sub-pixel signal transmission unit 374, the gate GA4 of the fourth sub-pixel signal transmission unit 374, the second drain D4, the gate GA5 of the fifth sub-pixel signal transmission unit 375, the source S5 of the fifth sub-pixel signal transmission unit 375, the drain D6 of the sixth sub-pixel signal transmission unit 376, the gate GA6 of the sixth sub-pixel signal transmission unit 376 and the source S6 of the sixth sub-pixel signal transmission unit 376 are arranged in sequence.

The first gate signal transmission end SW1 is coupled to the gate GA1 of the first sub-pixel signal transmission unit 371 and the gate GA4 of the fourth sub-pixel signal transmission unit 374. The second gate signal transmission end SW2 is coupled to the gate GA2 of the second sub-pixel signal transmission unit 372 and the gate GA5 of the fifth sub-pixel signal transmission unit 375. The third gate signal transmission end SW3 is coupled to the gate GA3 of the third sub-pixel signal transmission unit 373 and the gate GA6 of the sixth sub-pixel signal transmission unit 376.

The first data line SL1 has a first end coupled to the source driver 330, and a second end coupled to the first drain D1 and the drain D3 of the third sub-pixel signal transmission unit 373, for providing data to the first drain D1 and the drain D3 of the third sub-pixel signal transmission unit 373.

The second data line SL2 has a first end coupled to the source driver 330, and a second end coupled to the second drain D4 and the drain D6 of the sixth sub-pixel signal transmission unit 376, for providing data to the second drain D4 and the drain D6 of the sixth sub-pixel signal transmission unit 376.

The first pixel 350 comprises a first sub-pixel R1, a second sub-pixel G1 and a third sub-pixel B1. The second pixel 360 comprises a fourth sub-pixel R2, a fifth sub-pixel G2 and a sixth sub-pixel B2. The first sub-pixel R1 is coupled to the source S1 of the first sub-pixel signal transmission unit 371. The second sub-pixel G1 is coupled to the source S5 of the fifth sub-pixel signal transmission unit 375. The third sub-pixel B1 is coupled to the source S3 of the third sub-pixel signal transmission unit 373. The fourth sub-pixel R2 is coupled to the source S4 of the fourth sub-pixel signal transmission unit 374. The fifth sub-pixel G2 is coupled to the source S2 of the second sub-pixel signal transmission unit 372. The sixth sub-pixel B2 is coupled to the source S6 of the sixth sub-pixel signal transmission unit 376. The first sub-pixel R1 and fourth sub-pixel R2 can be red sub-pixels, the second sub-pixel G1 and the fifth sub-pixel G2 can be green sub-pixels, and the third sub-pixel B1 and the sixth sub-pixel B2 can be blue sub-pixels. The polarity of data provided by the first data line SL1 is inversed to the polarity of data provided by the second data line SL2 in the same frame. That is, the polarities of data provided by the first data line SL1 and the second data line SL2 are logically inversed.

In the display 300, the second sub-pixel G1 is coupled to the source S5 of the fifth sub-pixel signal transmission unit 375 through a first crossing line 391 crossing the source S2 of the second sub-pixel signal transmission unit 372, the source S3 of the third sub-pixel signal transmission unit 373 and the source S4 of the fourth sub-pixel signal transmission unit 374 in sequence. The third sub-pixel B1 is coupled to the source S3 of the third sub-pixel signal transmission unit 373 through crossing the source S2 of the second sub-pixel signal transmission unit 372 and the source S5 of the fifth sub-pixel signal transmission unit 375 in sequence. The fourth sub-pixel R2 is coupled to the source S4 of the fourth sub-pixel signal transmission unit 374 through crossing the source S2 of the second sub-pixel signal transmission unit 372 and the source S5 of the fifth sub-pixel signal transmission unit 375 in sequence. The fifth sub-pixel G2 is coupled to the source S2 of the second sub-pixel signal transmission unit 372 through a second crossing line 392 crossing the source S4 of the fourth sub-pixel signal transmission unit 374 and the source S3 of the third sub-pixel signal transmission unit 373 in sequence.

Because in the display 200 of the first embodiment, the polarities of the first sub-pixel R1 to the sixth sub-pixel GX2 are "+, +, −, −, −, +" respectively, the positions of the second sub-pixel BX1 and the third sub-pixel GX1 should be switched, and the positions of the fifth sub-pixel BX2 and the sixth sub-pixel GX2 should be switched to obtain alternating polarities "+, −, +, −, +, −". Though the positions of the second sub-pixel BX1 and the third sub-pixel GX1 and the positions of the fifth sub-pixel BX2 and the sixth sub-pixel GX2 can be switched by a further circuitry layout process, if the sub-pixels were arranged in the manner as shown in FIG. 3, no more additional circuitry layout process is required since the polarities of the first sub-pixel R1 to the sixth sub-pixel B2 are already alternating as "+, −, +, −, +, −". Compared with the display 200, the display 300 further simplifies circuitry layout and reduces power consumption.

Figure 4:
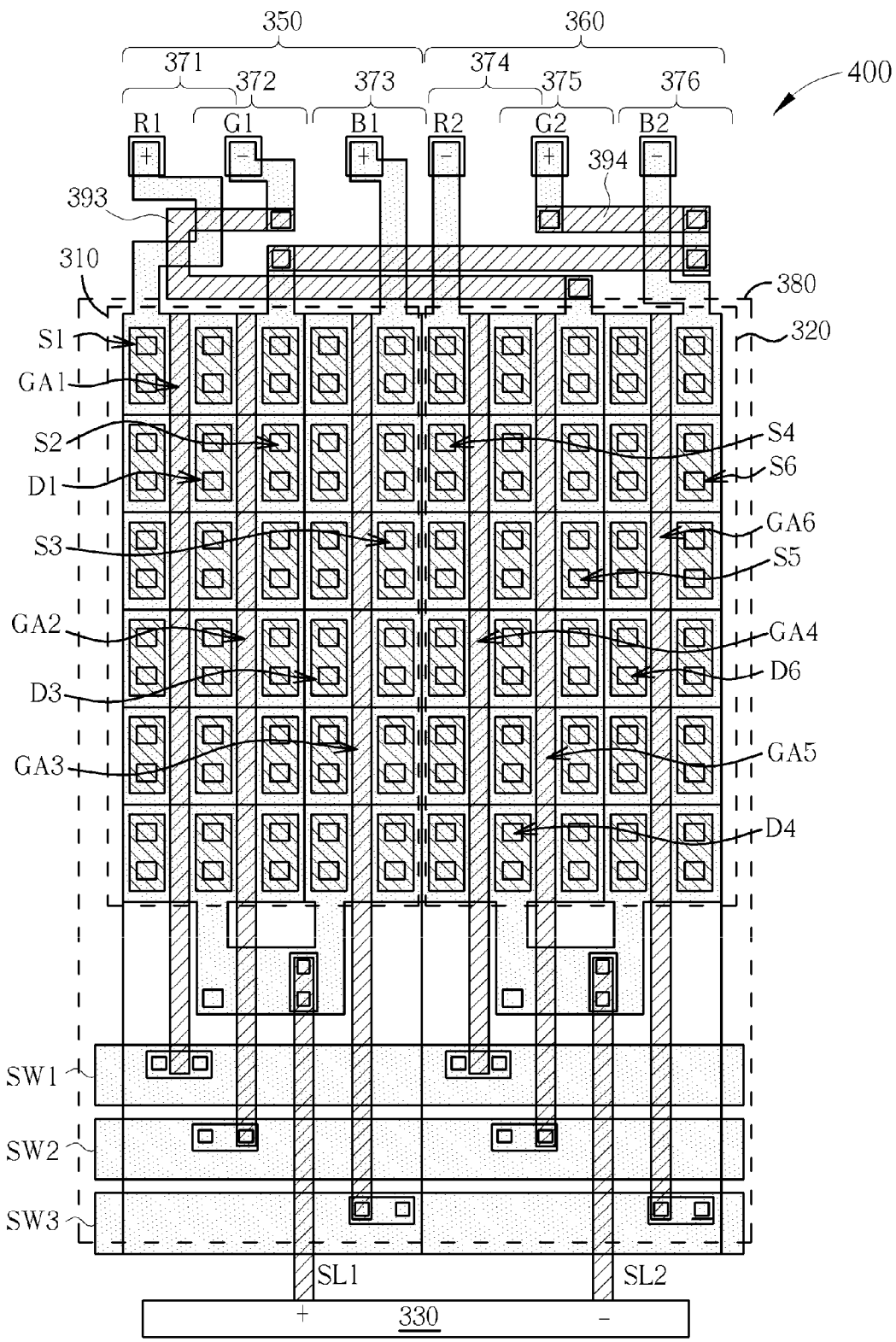
FIG. 4 shows a display according to a third embodiment of the present invention.

Please refer to FIG. 4, which shows a display 400 according to a third embodiment of the present invention. The difference between the displays 400 and 300 is that, in the display 400, the first sub-pixel R1 is coupled to the source S1 of the first sub-pixel signal transmission unit 371 through crossing the source S5 of the fifth sub-pixel signal transmission unit 375 twice. The second sub-pixel G1 is coupled to the source S5 of the fifth sub-pixel signal transmission unit 375 through a third crossing line 393 crossing the source S1 of the first sub-pixel signal transmission unit 371 twice, the source S2 of the second sub-pixel signal transmission unit 372, the source S3 of the third sub-pixel signal transmission unit 373 and the source S4 of the fourth sub-pixel signal transmission unit 374 in sequence. The third sub-pixel B1 is coupled to the source S3 of the third sub-pixel signal transmission unit 373 through crossing the source S2 of the second sub-pixel signal transmission unit 372 and the source S5 of the fifth sub-pixel signal transmission unit 375 in sequence. The fourth sub-pixel R2 is coupled to the source S4 of the fourth sub-pixel signal transmission unit 374 through crossing the source S2 of the second sub-pixel signal transmission unit 372 and the source S5 of the fifth sub-pixel signal transmission unit 375 in sequence. The fifth sub-pixel G2 is coupled to the source S2 of the second sub-pixel signal transmission unit 372 through a fourth crossing line 394 crossing the source S6 of the sixth sub-pixel signal transmission unit 376 twice, the source S4 of the fourth sub-pixel signal transmission unit 374, the source S3 of the third sub-pixel signal transmission unit 373 and the source S5 of the fifth sub-pixel signal transmission unit 375 in sequence. The sixth sub-pixel B2 is coupled to the source S6 of the sixth sub-pixel signal transmission unit 376 through crossing the source S2 of the second sub-pixel signal transmission unit 372 twice.

Similarly, in the display 400 of the third embodiment, since the polarities of the first sub-pixel R1 to the sixth sub-pixel B2 are already "+, −, +, −, +, −," no additional circuitry layout process is required to switch the positions of sub-pixels so as to improve the display quality of the display 400. Compared with the display 200, the display 400 further simplifies circuitry layout and reduces power consumption. Besides in the third embodiment, the first sub-pixel R1 and the fourth sub-pixel R2 both cross sources of sub-pixel signal transmission units twice, the second sub-pixel G1 and the fifth sub-pixel G2 both cross sources of sub-pixel signal transmission units five times, and the third sub-pixel B1 and the sixth sub-pixel B2 both cross sources of sub-pixel signal transmission units twice. Thus, the capacitance effects in the adjacent pixels are more balanced. Therefore, compared with the display 300, the display 400 is capable of displaying more balanced images.

In view of above, the source drivers of the displays 200 to 400 can keep outputting signals with the same polarities, thus reducing the power consumptions of the displays 200 to 400. By having the first sub-pixel R1 and the second sub-pixel G1 sharing a drain, and having the fourth sub-pixel R2 and the fifth sub-pixel G2 sharing another drain, the space allocated to the demultiplexer 280 of the displays 200 to 400 is reduced. Moreover the display 400 is capable of displaying more balanced image by having same color sub-pixels crossing sources of sub-pixel signal transmission units the same number of times.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display comprising:
    a source driver for providing data;
    a demultiplexer, comprising:
        a first pixel signal transmission unit, comprising a first sub-pixel signal transmission unit, a second sub-pixel signal transmission unit and a third sub-pixel signal transmission unit; and
        a second pixel signal transmission unit adjacent to the first pixel signal transmission unit, the second pixel signal transmission unit comprising a fourth sub-pixel signal transmission unit, a fifth sub-pixel signal transmission unit and a sixth sub-pixel signal transmission unit, the first sub-pixel signal transmission unit and the second sub-pixel signal transmission unit having a first drain, and the fourth sub-pixel signal transmission unit and the fifth sub-pixel signal transmission unit having a second drain;
    a first gate signal transmission end, coupled to a gate of the first sub-pixel signal transmission unit and a gate of the fourth sub-pixel signal transmission unit;
    a second gate signal transmission end, coupled to a gate of the second sub-pixel signal transmission unit and a gate of the fifth sub-pixel signal transmission unit; and
    a third gate signal transmission end, coupled to a gate of the third sub-pixel signal transmission unit and a gate of the sixth sub-pixel signal transmission unit;
    a first data line, having a first end coupled to the source driver, and a second end coupled to the first drain and a drain of the third sub-pixel signal transmission unit, for providing data to the first drain and the drain of the third sub-pixel signal transmission unit;
    a second data line, having a first end coupled to the source driver, and a second end coupled to the second drain and a drain of the sixth sub-pixel signal transmission unit, for providing data to the second drain and the drain of the sixth sub-pixel signal transmission unit;
    a first pixel, comprising:
        a first sub-pixel, coupled to a source of the first sub-pixel signal transmission unit;
        a second sub-pixel, coupled to a source of the fifth sub-pixel signal transmission unit through a first crossing line crossing the source of the second sub-pixel signal transmission unit, the source of the third sub-pixel signal transmission unit and the source of the fourth sub-pixel signal transmission unit in sequence; and
        a third sub-pixel, coupled to a source of the third sub-pixel signal transmission unit; and
    a second pixel, comprising:
        a fourth sub-pixel, coupled to a source of the fourth sub-pixel signal transmission unit;
        a fifth sub-pixel, coupled to a source of the second sub-pixel signal transmission unit through a second crossing line crossing the source of the fourth sub-pixel signal transmission unit, the source of the third sub-pixel signal transmission unit and the source of the second sub-pixel signal transmission unit in sequence; and
        a sixth sub-pixel, coupled to a source of the sixth sub-pixel signal transmission unit.

2. The display of claim 1, wherein a polarity of data provided by the first data line is inversed to a polarity of data provided by the second data line in a same frame.

3. A display comprising:
    a source driver for providing data;
    a demultiplexer, comprising:
        a first pixel signal transmission unit, comprising a first sub-pixel signal transmission unit, a second sub-pixel signal transmission unit and a third sub-pixel signal transmission unit; and
        a second pixel signal transmission unit adjacent to the first pixel signal transmission unit, the second pixel signal transmission unit comprising a fourth sub-pixel signal transmission unit, a fifth sub-pixel signal transmission unit and a sixth sub-pixel signal transmission unit, the first sub-pixel signal transmission unit and the second sub-pixel signal transmission unit having a first drain, and the fourth sub-pixel signal transmission unit and the fifth sub-pixel signal transmission unit having a second drain;
    a first gate signal transmission end, coupled to a gate of the first sub-pixel signal transmission unit and a gate of the fourth sub-pixel signal transmission unit;
    a second gate signal transmission end, coupled to a gate of the second sub-pixel signal transmission unit and a gate of the fifth sub-pixel signal transmission unit; and
    a third gate signal transmission end, coupled to a gate of the third sub-pixel signal transmission unit and a gate of the sixth sub-pixel signal transmission unit;
    a first data line, having a first end coupled to the source driver, and a second end coupled to the first drain and a drain of the third sub-pixel signal transmission unit, for providing data to the first drain and the drain of the third sub-pixel signal transmission unit;
    a second data line, having a first end coupled to the source driver, and a second end coupled to the second drain and a drain of the sixth sub-pixel signal transmission unit, for providing data to the second drain and the drain of the sixth sub-pixel signal transmission unit;
    a first pixel, comprising:
        a first sub-pixel, coupled to a source of the first sub-pixel signal transmission unit through crossing a source of the fifth sub-pixel signal transmission unit twice;
        a second sub-pixel, coupled to the source of the fifth sub-pixel signal transmission unit through a third crossing line crossing the source of the first sub-pixel signal transmission unit twice, a source of the second sub-pixel signal transmission unit, a source of the third sub-pixel signal transmission unit and a source of the fourth sub-pixel signal transmission unit in sequence; and
        a third sub-pixel, coupled to the source of the third sub-pixel signal transmission unit through crossing the source of the second sub-pixel signal transmission unit and the source of the fifth sub-pixel signal transmission unit in sequence; and a second pixel, comprising:
  a fourth sub-pixel, coupled to the source of the fourth sub-pixel signal transmission unit through crossing the source of the second sub-pixel signal transmission unit and the source of the fifth sub-pixel signal transmission unit in sequence;
  a fifth sub-pixel, coupled to a source of the second sub-pixel signal transmission unit through a fourth crossing line crossing the source of the sixth sub-pixel signal transmission unit twice, the source of the fourth sub-pixel signal transmission unit, the source of the third sub-pixel signal transmission unit and the source of the fifth sub-pixel signal transmission unit in sequence; and
  a sixth sub-pixel, coupled to a source of the sixth sub-pixel signal transmission unit through crossing the source of the second sub-pixel signal transmission unit twice.

4. The display of claim 3, wherein the source of the first sub-pixel signal transmission unit, the gate of the first sub-pixel signal transmission unit, the first drain, the gate of the second sub-pixel signal transmission unit, the source of the second sub-pixel signal transmission unit, the drain of the third sub-pixel signal transmission unit, the gate of the third sub-pixel signal transmission unit, the source of the third sub-pixel signal transmission unit, the source of the fourth sub-pixel signal transmission unit, the gate of the fourth sub-pixel signal transmission unit, the second drain, the gate of the fifth sub-pixel signal transmission unit, the source of the fifth sub-pixel signal transmission unit, the drain of the sixth sub-pixel signal transmission unit, the gate of the sixth sub-pixel signal transmission unit and the source of the sixth sub-pixel signal transmission unit are arranged in sequence.

5. The display of claim 4, wherein the first, second, third, fourth, fifth and sixth sub-pixels are arranged in sequence.

6. A display comprising:
  a demultiplexer, comprising:
    a first pixel signal transmission unit, comprising a first sub-pixel signal transmission unit, a second sub-pixel signal transmission unit and a third sub-pixel signal transmission unit; and
    a second pixel signal transmission unit adjacent to the first pixel signal transmission unit, the second pixel signal transmission unit comprising a fourth sub-pixel signal transmission unit, a fifth sub-pixel signal transmission unit and a sixth sub-pixel signal transmission unit, the first sub-pixel signal transmission unit and the second sub-pixel signal transmission unit having a first drain, and the fourth sub-pixel signal transmission unit and the fifth sub-pixel signal transmission unit having a second drain;
    a first gate signal transmission end, coupled to a gate of the first sub-pixel signal transmission unit and a gate of the fourth sub-pixel signal transmission unit;
    a second gate signal transmission end, coupled to a gate of the second sub-pixel signal transmission unit and a gate of the fifth sub-pixel signal transmission unit; and
    a third gate signal transmission end, coupled to a gate of the third sub-pixel signal transmission unit and a gate of the sixth sub-pixel signal transmission unit;
  a first data line, coupled to the first drain and a drain of the third sub-pixel signal transmission unit, for providing data to the first drain and the drain of the third sub-pixel signal transmission unit;
  a second data line, coupled to the second drain and a drain of the sixth sub-pixel signal transmission unit, for providing data to the second drain and the drain of the sixth sub-pixel signal transmission unit;
  a first pixel, comprising:
    a first sub-pixel, coupled to a source of the first sub-pixel signal transmission unit;
    a second sub-pixel, coupled to a source of the fifth sub-pixel signal transmission unit through a first crossing line crossing a source of the second sub-pixel signal transmission unit, a source of the third sub-pixel signal transmission unit and a source of the fourth sub-pixel signal transmission unit in sequence; and
    a third sub-pixel, coupled to the source of the third sub-pixel signal transmission unit; and
  a second pixel, comprising:
    a fourth sub-pixel, coupled to the source of the fourth sub-pixel signal transmission unit;
    a fifth sub-pixel, coupled to the source of the second sub-pixel signal transmission unit through a second crossing line crossing a source of the fourth sub-pixel signal transmission unit, a source of the third sub-pixel signal transmission unit and a source of the second sub-pixel signal transmission unit in sequence; and
    a sixth sub-pixel, coupled to a source of the sixth sub-pixel signal transmission unit.

7. The display of claim 6, wherein a polarity of data provided by the first data line is inversed to a polarity of data provided by the second data line in a same frame.

* * * * *